UNITED STATES PATENT OFFICE.

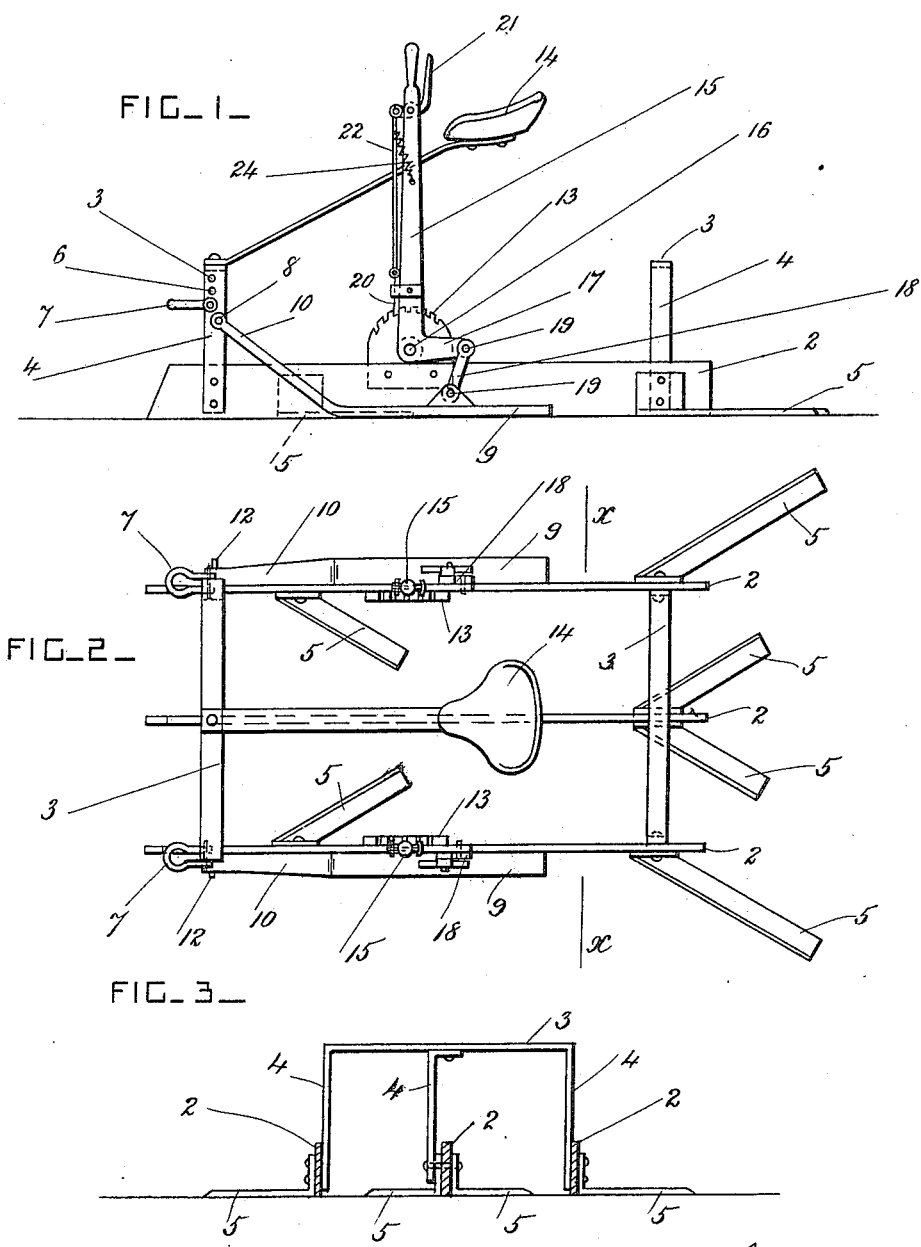

CARL G. SIGURD, OF SAN JOSE, CALIFORNIA.

WEED-CUTTER.

1,214,383. Specification of Letters Patent. Patented Jan. 30, 1917.

Application filed February 29, 1916. Serial No. 81,160.

*To all whom it may concern:*

Be it known that I, CARL G. SIGURD, a citizen of the United States, residing at San Jose, in the county of Santa Clara and State of California, have invented certain new and useful Improvements in Weed-Cutters; and I do hereby declare the following to be a full, clear, and exact description of the invention, such as will enable others skilled in the art to which it appertains to make and use the same.

This invention relates to machines for cutting weeds on farms; and it consists in the novel construction and combination of the parts hereinafter fully described and claimed whereby the height of the cutting knives is regulated and whereby the machine may be drawn over hard ground without injuring the sharp knives.

In the drawings, Figure 1 is a side view of a weed cutter constructed according to this invention. Fig. 2 is a plan view of the same. Fig. 3 is a cross-section through the runners, taken on the line $x$—$x$ in Fig. 2.

Three main runners 2 are provided and are arranged parallel to each other. Front and rear frames 3 are formed of bars provided with vertical portions 4 which are secured to the main runners, so that the main portions of the frames are raised to permit the passage of weeds between the runners. The main runners are flat bars set on edge, and inclined knives 5 are secured to them. The knives are arranged so as to sweep over all the ground between the main runners, and for some distance outside the outer runners. The front knives are arranged at the front end portion of the side runners and project inwardly toward the center or middle runner. The rear knives are secured to all three runners and they project outwardly. All the knives are arranged above the level of the bottom surfaces of the main runners. Their cutting edges may be level with the bottom surfaces of the runners, but should not be below them. The weeds are cut in wide strips, and the bearing at one side of the machine can be varied without affecting the bearing at the other side of the machine, which is advantageous in a wide machine. The front frame is provided with holes 6 for clevises 7 by means of which the machine is drawn along, and it also has pivot holes 8 for the attachment of the adjustable runners 9.

Two adjustable runners 9 are provided, and they are arranged at opposite sides of the machine, close to the main outer runners. The runners 9 have broad blades which are arranged at the middle part of the machine opposite the front knives, and they have upwardly inclined front portions 10 which are pivoted by pins 12 in the holes 8 of the front frame. A seat 14 for the driver is supported above the middle main runner, at the middle part of the machine, and hand levers 15 are provided, for controlling the adjustable runners 9, and are arranged one on each side of the seat 14. The seat 14 is arranged at the middle part of the length of the machine so that the weight of the driver is distributed evenly between the front and rear parts of the runners 2, and the levers 15 are arranged conveniently with relation to the seat 14. Two levers are provided so that each runner 9 is operated independently of the other. The levers are pivoted adjacent to the tops of the runners 2, and no bar or shaft extends across the middle part of the machine.

Each hand lever 15 is pivoted by a pin 16 to a toothed quadrant 13 secured to one of the main runners, and is provided with a crank arm 17. The crank arm 17 is connected to a lug on the runner 9 below it by a rod or link 18 and pins 19. A catch 20 is arranged to engage with the toothed quadrant, and is carried by the hand lever. This catch is worked by a bell-crank lever 21 pivoted to the hand lever, and a rod 22 pivoted to the bell-crank lever and the catch 20, and provided with a spring 24 for depressing the catch and holding it in engagement with the quadrant. Any other approved catch mechanism may however be used for locking the adjustable runners after their position has been adjusted.

The runners 9 are depressed by hand to raise the knives clear of the ground when the machine is drawn across a road or over any hard surface which might blunt the sharp edges of the knives. The runners 9 are also used to vary the height above the ground at which the knives operate, and the runners 9 may be raised clear of the ground, if desired, to let the machine slide on its main runners in the usual manner.

What I claim is:

In a weed cutter, front and rear frames each comprising a raised crossbar and depending vertical arms at its ends and middle part, three main ground runners secured to the said arms, front and rear weed-cutting knives secured to the said ground runners and arranged above the level of their bottom surfaces, the front knives being secured to the side runners and projecting inwardly toward the center runner, and the rear knives being secured to all three runners and projecting outwardly, two adjustable auxiliary ground runners pivoted to the arms of the front frame and arranged to the rear of the front knives and in advance of the rear knives, and means for raising and lowering each adjustable runner independently of the other.

In testimony whereof I have affixed my signature in the presence of two witnesses.

CARL G. SIGURD.

Witnesses:
EMMA L. WRETMAN,
N. E. WRETMAN.

Copies of this patent may be obtained for five cents each, by addressing the "Commissioner of Patents, Washington, D. C."